July 3, 1962
H. GUTSCHE
3,042,494
METHOD FOR PRODUCING HIGHEST-PURITY SILICON
FOR ELECTRIC SEMICONDUCTOR DEVICES
Filed May 23, 1958
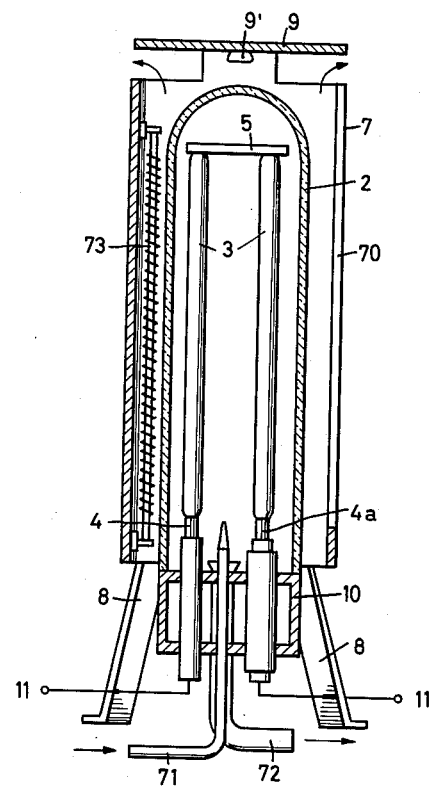

| United States Patent Office | 3,042,494 |
|---|---|
| | Patented July 3, 1962 |

3,042,494
METHOD FOR PRODUCING HIGHEST-PURITY SILICON FOR ELECTRIC SEMICONDUCTOR DEVICES

Heinrich Gutsche, Erlangen, Germany, assignor to Siemens-Schuckertwerke Aktiengesellschaft, Berlin-Siemensstadt and Erlangen, Germany, a corporation of Germany
Filed May 23, 1958, Ser. No. 737,254
Claims priority, application Germany May 29, 1957
12 Claims. (Cl. 23—223.5)

My invention particularly relates to a method for producing highest-purity silicon primarily for electric semiconductor devices, and in that respect is an improvement of the method and devices disclosed in the copending patent applications of Schweickert et al., Serial No. 665,086, filed June 11, 1957, now Patent No. 3,011,877, and Serial No. 736,387, filed May 19, 1958. According to such method, the silicon is precipitated from the gaseous phase by chemical conversion onto a carrier body likewise consisting of silicon, the silicon carrier having been previously produced by the same method, that is, by dividing the silicon body into a carrier of reduced cross-section. All pertinent details of the co-pending applications are incorporated herein by reference.

An object of my invention is to increase the efficiency and yield of such methods. Another object is to minimize possibility of trouble or danger in operation thereof.

To this end, and in accordance with my invention, the method referred to above is carried out within a transparent reaction vessel made of a material such as glass or quartz preferably, and the temperature of this vessel is kept between approximately 300° C. and approximately 800° C. during the precipitating process.

The invention is predicated upon the following observations and considerations.

To obtain silicon by precipitating it from the gaseous phase onto a glowing silicon carrier in the presence of hydrogen, there has often been used a water cooled reaction vessel which is relatively narrow, partly to minimize the space requirements and partly to secure a given flow velocity of the reaction mixture. When a vessel of this kind is employed, silicon halogenides of higher molecular constitution precipitate in the form of an oil on the cold wall of the vessel. This oil runs downward along the wall and is lost, or not available, to the process. This entails a reduction in yield because the oily precipitate contains, on the average, about 25% silicon. Furthermore, the oil is vigorously aggressive, chemically, and is self-ignitable in air, so that the servicing of the equipment is not free of hazard, particularly when removing the completed silicon rods and when cleaning the vessel.

If water cooling is not applied to the outside of the vessel there is formed on the inner side of the relatively narrow vessel, at very high wall temperatures in the range of 1000° C., a silicon precipitate in solid form, having the appearance of a mirror-like coating. This renders the vessel wall opaque and makes it impossible to visually observe the course of the process. A coating, which is opaque in a similar manner, is also formed when a vessel of greater width is used, because the wall temperature remains below 300° C.

The formation of the above-mentioned coating is avoided if, according to the invention, the process is conducted while maintaining the vessel wall at a temperature between about 300° C. and about 800° C. With a given processing equipment, the temperature of the vessel wall increases with increasing duration of the process. This is due to the fact that as the thickness of the silicon body being produced increases the maintenance of the most favorable processing temperature, which is approximately 1100° C., requires an increasing supply of heating power through the carrier rod. Consequently, as a result of the gradually increasing surface area of the glowing silicon body, a gradually increasing amount of heat is radiated off toward the vessel wall. It may therefore happen that, during the course of the process, the vessel wall temperature increases from an initial value considerably below 300° C. to a much higher value. It has been observed, accordingly, that, during a first partial period of processing, the vessel wall became coated and opaque, whereas in the further processing period this coating again vanished and the vessel then remained clear and transparent up to the termination of the process. The lack of observability, however, is particularly objectionable during the first period or stage of the process because the danger of the carrier rods melting through remains relatively great so long as the rods are still thin. This danger is lessened as the rods become thicker, because the thicker rods have a correspondingly increased heat capacity.

This difficulty is eliminated if, according to the invention, the temperature of the reaction vessel is already raised to at least 300° C., in the first stage of the process, and is thereafter kept constant, or at least approximately so, during the entire process.

It is also possible to use as carrier body, from the start of the process, a silicon rod of a thickness of such largeness that the heat radiated from the rod, which is in glowing condition, toward the wall of the reaction vessel suffices to heat the vessel wall to at least about 300° C. However, the efficiency of the process is greater when the process is commenced with a thinner rod. In the latter case, the required vessel temperature can be obtained from the commencement of the process by applying an external source of heat which additionally heats the reaction vessel. For this purpose, and for example, an electric tubular furnace, which may be of relatively simple design, may be placed about the reaction vessel, and may later be removed when the thickening of the carrier body has progressed to such an extent that the required vessel temperature is attained by the increased heat radiation alone, i.e. without additional external heating. The furnace may also be used to start the heating of the carrier body or bodies at the commencement of the process until the conductivity of the solid silicon is increased to such an extent that the available current source suffices to heat the silicon rod or rods by Joule's heat up to the required processing temperature. This has the advantage of eliminating the need for a special current source of high voltage, which otherwise is needed in order to supply to the cold carrier rods a heating current sufficient for initially heating the rods up to a temperature at which they become conductive.

According to another feature of my invention, the desired temperature of the vessel wall, when using thin carrier rods, can also be obtained independently of an exterior heat source by employing an improved design of the device for performing the method. For example, the reaction vessel may be formed of a glass- or quartz-material having radiation-absorbing foreign inclusions e.g. small particles of a suitable high melting metal as gold, molybdenum etc. in uniform distribution not appreciably affecting the transparency of the vessel wall. Another way of providing such improved device is to make the reaction vessel of opaque glass or quartz which possesses one or more transparent locations or "windows" preferably in the shape of narrow strips. These narrow strips extend ring-shaped about the vessel, or also in the longitudinal direction of the vessel. The transparent strips or "window" may also form an area pattern. The other portions of the reaction vessel may be made opaque for instance by roughening their surface so that they possess an increased absorption ability. However, the reaction vessel may also be provided with a separate, radiation-absorbing coating or jacket which leaves one or several windows or viewing slots open and which may consist of aluminum-oxide for instance.

Another means for increasing the temperature of the vessel wall when using thin rods consists in mounting on the exterior side of the vessel a reflector which partially reflects the irradiated heat. Due to the repeated passage of the heat radiation through the vessel wall, a correspondingly greater quantity is absorbed by the wall. The reflector may surround the vessel annularly, or the vessel may be provided, preferably on the outside, with a mirror coating of silver or gold. One or more viewing windows remain free of the mirror coating.

The reflector has the further advantage of considerably reducing the losses due to radiation of heat into the ambient space. It is possible to produce, with a given power supply in a given apparatus, rods of greater thickness than can be produced without a reflector. Furthermore, the reduction in radiation of heat from the apparatus also improves the working conditions of the servicing and observing personnel. The reflector may also consist of a separate sheet mounted at some distance from the vessel wall.

A preferred embodiment of an apparatus to be employed for the purpose of the invention is schematically illustrated in the drawing.

The reaction vessel of the apparatus consists of a quartz bell 2. The diameter of the bell may be 8 centimeters and the height may be 40 centimeters, for instance. The bell is closed, and gas-tightly sealed, by means of a mounting head 10. Secured to the mounting head 10 by means of suitable holding devices 4 and 4a are the carrier rods 3 consisting of highest-purity silicon. The mounting head 10 may consist of silver coated brass, for example. The two holders 4 and 4a pass through the mounting head, and one of them, 4a, is insulated from the mounting head. At the outside of the bell, the holders are electrically connected to two current supply terminals 11, the left one of which is also in conducting connection with the mounting head 10. The upper ends of the carrier rods 3 are connected by an electrically conducting bridge member 5 of graphite, for example. A nozzle 71 for the supply of the gas mixture and an outlet duct 72 are likewise inserted into the mounting head 10. An auxiliary electric heater of the ordinary resistance type is shown at 73. Several auxiliary heaters may be provided around the bell 2, for initiating the heating up of the rods 3 as well as for increasing the temperature of the bell wall during processing. An electric power source having conventional means for controlling the heating power can be used to supply the heaters.

The reaction vessel is surrounded by a tubular reflector 7 of glossy aluminum. The heaters 73 may be mounted thereon, thus forming a cylindrical furnace of simple construction. The reflector may have a height of 24 centimeters and a diameter of 16 centimeters. The reflector is mounted on three legs designated 8 and has on one side a longitudinally extending gap 70 of 20 millimeters, for example, which permits visual observation of the glowing silicon rods 3 during the processing. The reflector 7 has an upper aluminum cover 9 which can be turned upwardly on hinge or fastener 9'. The opening of the cover 9 provides air cooling by chimney action, thus avoiding overheating of the jacket of air which surrounds the quartz bell, and thus preventing excessive heating of the quartz bell. The flow cross-section for the convection air can be varied by opening the cover 9 to respectively different extents.

The processes employed for precipitating the silicon on the silicon carrier body are similar to those described in the above-mentioned co-pending applications. The latter describe various processes for decomposing halogen compounds of silicon or germanium, and other semiconductors, in contact with glowing carrier rods, of silicon or germanium for example. For instance, silicon is precipitated by decomposing silicon tetrachloride or silicon hydrogen chloride, with hydrogen, by introducing a mixture of the gases at high velocity through a jet nozzle, to provide turbulent flow. Optimum proportions and reaction temperatures are described in said applications. For deposition of silicon the glowing silicon rods are maintained at 1100° to 1200° C. About 1150° C. is the most favorable temperature. The silicon body so produced is sliced longitudinally of its length, or angularly thereof, to provide the new carrier body of reduced cross-section. As stated above, the reduced cross-section is preferred because it facilitates the initial heating of the carrier body to the required gas decomposition temperature.

Although in the preferred form the lateral walls of the reaction vessel are substantially of glass or quartz, other siliceous materials can be used. Moreover the silicon carrier body need not be produced by the preferred subdividing method referred to above, but can also be produced by moulding or by drawing from a molten mass or by sintering or pressing powdered material and followed by crucible-free zone melting process step.

I claim:
1. In a method of producing silicon of high purity, for use in electrical semiconducting devices, in which method silicon is precipitated onto a hot carrier body of silicon by gas-phase chemical conversion of a halogen compound of silicon by contact thereof with the hot body, the improvement comprising carrying out said method in an at least partly transparent reaction vessel at least partly comprised of a siliceous material of the group consisting of glass and quartz, the hot body being heated to about 1100° to 1200° C. by passage of an electric current therethrough, and maintaining the temperature of the inner walls of the vessel at between about 300° C. and 800° C. during the precipitation period, to minimize formation of a coating of high molecular weight silicon halogenide on the surfaces of the reaction vessel.

2. In a method of producing silicon of high purity, for use in electrical semiconducting devices, in which method silicon is precipitated onto a glowing carrier rod of silicon by gas-phase chemical reaction of a chlorine compound of silicon with hydrogen by contact thereof with the rod, the improvement comprising carrying out said method in an at least partly transparent reaction vessel at least partly comprised of a siliceous material of the group consisting of glass and quartz, the rod being heated to a temperature of at least 1100° C. by passage of an electric current therethrough, and maintaining the temperature of the inner walls of the vessel at between about 300° C. and 800° C. during the precipitation period, the silicon carrier rod being initially of such thickness that the radiation issuing from the glowing rod, toward the walls of the reaction vessel heats the latter to at least about 300° C., to minimize formation of a coating of high molecular weight silicon-chlorine compound on the surfaces of the reaction vessel.

3. In a method of producing silicon for use in electrical semiconducting devices, in which method silicon is precipitated onto a hot carrier body of silicon by gas-phase chemical conversion of a halogen compound of silicon by contact thereof with the hot body, subdividing the so-produced silicon body to provide pieces of reduced cross section, and again precipitating silicon thereon as aforesaid, the improvement comprising carrying out said method in an at least partly transparent reaction vessel comprised of a siliceous material of the group consisting of glass and quartz, the carrier body being heated to at least about 1100° to 1200° C. by passage of electric current lengthwise thereof, and maintaining the temperature of the inner walls of the vessel at between about 300° C. and 800° C. during the precipitation period, the said wall temperature being raised to at least 300° C. prior to the initiating stage of the silicon precipitation, to minimize formation of a coating of high molecular weight silicon 4. In a method of producing silicon for use in electrical semiconducting devices, in which method silicon is precipitated onto a hot carrier body of silicon by gas-phase chemical conversion of a halogen compound of silicon by contact thereof with the hot body, subdividing the so-produced silicon body to provide pieces of reduced cross section, and again precipitating silicon thereon as aforesaid, the improvement comprising carrying out said method in an at least partly transparent reaction vessel comprised of a siliceous material of the group consisting of glass and quartz, the carrier body being heated to at least about 1100° C. by passage of an electric current therein, and maintaining the temperature of the inner walls of the vessel at between about 300° C. and 800° C. during the precipitation period, the said wall temperature being raised to at least 300° C. during the initiating stage of the silicon precipitation, the process being initiated by applying a heat source externally of the vessel to heat the rod.

5. In a method of producing silicon for use in electrical semiconducting devices, in which method silicon is precipitated onto a glowing carrier body of silicon by gas-phase chemical reaction of a chlorine compound of silicon with hydrogen by contact thereof with the hot body, the improvement comprising carrying out said method in an at least partly transparent reaction vessel at least the transparent part of which is comprised of a siliceous material of the group consisting of quartz and glass, the carrier body being heated to at least about 1100° C. by passage of an electric current therein, and maintaining the temperature of the inner walls of the vessel at between about 300° C. and 800° C. during the silicon precipitation period, to minimize formation of a coating of high molecular weight silicon-chlorine compound on the surfaces of the reaction vessel.

6. In a method of producing silicon for use in electrical semiconducting devices, in which method silicon is precipitated onto a glowing carrier body of silicon by gas-phase chemical conversion of a halogen compound of silicon by contact thereof with the hot body, the improvement comprising carrying out said method in an at least partly transparent reaction vessel at least the transparent part of which is comprised of a siliceous material of the group consisting of quartz and glass, the hot body being heated to about 1100° C. to 1200° C. by passage of an electric current therethrough, and maintaining the temperature of the inner walls of the vessel at between about 300° C. and 800° C. during the precipitation period, the said wall temperature being raised to at least 300° C. during the initiating stage of the silicon precipitation, to minimize formation of a coating of high molecular weight silicon halogenide on the surfaces of the reaction vessel during said initiating stage and thereafter.

7. In a method of producing silicon of high purity, for use in electrical semiconducting devices, in which method silicon is precipitated onto a glowing carrier body of silicon by gas-phase chemical conversion of a halogen compound of silicon by contact thereof with the hot body, the improvement comprising carrying out said method in an at least partly transparent reaction vessel at least the transparent part of which is comprised of a siliceous material of the group consisting of quartz and glass, the carrier body being heated to at least about 1100° C. by passage of an electric current therein, and maintaining the temperature of the inner walls of the vessel at between about 300° C. and 800° C. during the precipitation period, the silicon carrier rod being initially of such thickness that the radiation issuing from the flowing rod toward the walls of the reaction vessel heats the latter to at least about 300° C., to minimize formation of a coating of high molecular weight silicon halogenide on the surfaces of the reaction vessel.

8. The method of claim 1, the halogen compound of silicon being silicon tetrachloride.

9. The method of claim 1, the halogen compound being silicon hydrogen chloride.

10. The method of claim 5, the halogen compound being silicon tetrachloride.

11. The method of claim 5, the halogen compound being silicon hydrogen chloride.

12. The method of claim 2, the halogen compound being silicon tetrachloride.

References Cited in the file of this patent

UNITED STATES PATENTS

| | | |
|---|---|---|
| 1,019,392 | Weintraub | Mar. 5, 1912 |
| 1,601,931 | Van Arkel | Oct. 5, 1926 |
| 1,671,213 | Van Arkel et al. | May 29, 1928 |
| 1,829,756 | Noddack et al. | Nov. 3, 1931 |
| 2,441,603 | Storks et al. | May 18, 1948 |
| 2,654,657 | Reed | Oct. 6, 1953 |
| 2,753,280 | Moore | July 13, 1956 |
| 2,763,581 | Freedman | Sept. 18, 1956 |
| 2,804,377 | Olson | Aug. 27, 1957 |
| 2,851,342 | Bradshaw et al. | Sept. 9, 1958 |
| 2,909,411 | Krchma | Oct. 20, 1959 |
| 2,912,311 | Mason et al. | Nov. 10, 1959 |

FOREIGN PATENTS

| | | |
|---|---|---|
| 203,200 | Australia | Sept. 10, 1956 |

OTHER REFERENCES

Fiat Final Report 789, "Experiments to Produce Ductile Silicon," April 1946.